US011349136B2

(12) United States Patent
Ramani

(10) Patent No.: US 11,349,136 B2
(45) Date of Patent: May 31, 2022

(54) FUEL CELL SYSTEM INCLUDING WOBBE INDEX DETECTOR AND METHOD OF OPERATING SAME

(71) Applicant: BLOOM ENERGY CORPORATION, San Jose, CA (US)

(72) Inventor: Venkat Ramani, Milpitas, CA (US)

(73) Assignee: BLOOM ENERGY CORPORATION, San Jose, CA (US)

(*) Notice: Subject to any disclaimer, the term of this patent is extended or adjusted under 35 U.S.C. 154(b) by 365 days.

(21) Appl. No.: 16/394,286

(22) Filed: Apr. 25, 2019

(65) Prior Publication Data

US 2019/0356001 A1 Nov. 21, 2019

Related U.S. Application Data

(60) Provisional application No. 62/674,163, filed on May 21, 2018.

(51) Int. Cl.
| | |
|---|---|
| *H01M 8/04089* | (2016.01) |
| *H01M 8/244* | (2016.01) |
| *H01M 8/2425* | (2016.01) |
| *H01M 8/0438* | (2016.01) |
| *H01M 8/04746* | (2016.01) |
| *H01M 8/12* | (2016.01) |

(52) U.S. Cl.
CPC ... *H01M 8/04089* (2013.01); *H01M 8/04388* (2013.01); *H01M 8/04753* (2013.01); *H01M 8/244* (2013.01); *H01M 8/2425* (2013.01); *H01M 2008/1293* (2013.01)

(58) Field of Classification Search
CPC ......... H01M 8/04089; H01M 8/04388; H01M 8/04753; H01M 8/2425; H01M 8/244
See application file for complete search history.

(56) References Cited

U.S. PATENT DOCUMENTS

| | | |
|---|---|---|
| 7,713,649 B2 | 5/2010 | Hickey et al. |
| 8,197,978 B2 | 6/2012 | Ballantine et al. |
| | (Continued) | |

FOREIGN PATENT DOCUMENTS

| | | | |
|---|---|---|---|
| JP | 4489326 B2 * | 6/2010 | |
| KR | 1020130071992 A | 7/2013 | |
| KR | 101303392 B1 * | 9/2013 | ........ H01M 8/04201 |

OTHER PUBLICATIONS

KR-101303392-B1 English machine translation (Year: 2021).*

(Continued)

*Primary Examiner* — Ula C Ruddock
*Assistant Examiner* — Armindo Carvalho, Jr.
(74) *Attorney, Agent, or Firm* — The Marbury Law Group PLLC

(57) ABSTRACT

A solid oxide fuel cell (SOFC) system and method, the system including a power module configured to receive a fuel from a fuel conduit of the system, the power module including a fuel cell stack, a module conduit fluidly connecting the fuel conduit and the stack, and a fuel control valve (FCV) configured to control a flow rate of the fuel in the module conduit. The system also includes a first detector configured to detect a first Wobbe Index (WI) of the fuel in the fuel conduit, and a controller configured to control the FCV to change the fuel flow rate based on whether the detected first WI indicates a change in the composition of the fuel.

12 Claims, 5 Drawing Sheets

(56) References Cited

U.S. PATENT DOCUMENTS

| | | |
|---|---|---|
| 8,211,583 B2 | 7/2012 | Weingaertner et al. |
| 8,273,487 B2 | 9/2012 | Gottmann |
| 9,190,693 B2 | 11/2015 | Sridhar et al. |
| 9,859,580 B2 | 1/2018 | Ballantine et al. |
| 2006/0204827 A1 | 9/2006 | Hickey et al. |
| 2008/0070077 A1 | 3/2008 | Gottmann |
| 2008/0124590 A1 | 5/2008 | Ballantine et al. |
| 2009/0068517 A1 | 3/2009 | Andersen et al. |
| 2009/0280360 A1 | 11/2009 | Weingaertner et al. |
| 2011/0281185 A1* | 11/2011 | Sridhar ............ H01M 8/0675 429/408 |
| 2012/0196201 A1 | 8/2012 | Bernard |
| 2015/0194685 A1* | 7/2015 | Ballantine ......... H01M 8/04089 429/410 |
| 2017/0069923 A1 | 3/2017 | Trevisan et al. |
| 2017/0250421 A1 | 8/2017 | Saito |
| 2017/0284919 A1* | 10/2017 | Slater ............... G01N 11/08 |
| 2017/0294665 A1* | 10/2017 | Ok ................... H01M 8/04291 |

OTHER PUBLICATIONS

JP-4489326-B2 English machine translation (Year: 2021).*

U.S. Appl. No. 15/803,461, filed Nov. 3, 2017, Bloom Energy Corporation.

U.S. Appl. No. 16/213,480, filed Dec. 7, 2018, Bloom Energy Corporation.

Notification of Transmittal of the International Search Report and Written Opinion of the International Search Authority for International Patent Application No. PCT/US2019/029101, dated Sep. 10, 2019, 12 pages.

Notification Concerning Transmittal of the International Preliminary Reporton Patentability and Written Opinion of the International Search Authority for International Patent Application No. PCT/US2019/029101, dated Dec. 2020, 9 pages.

* cited by examiner

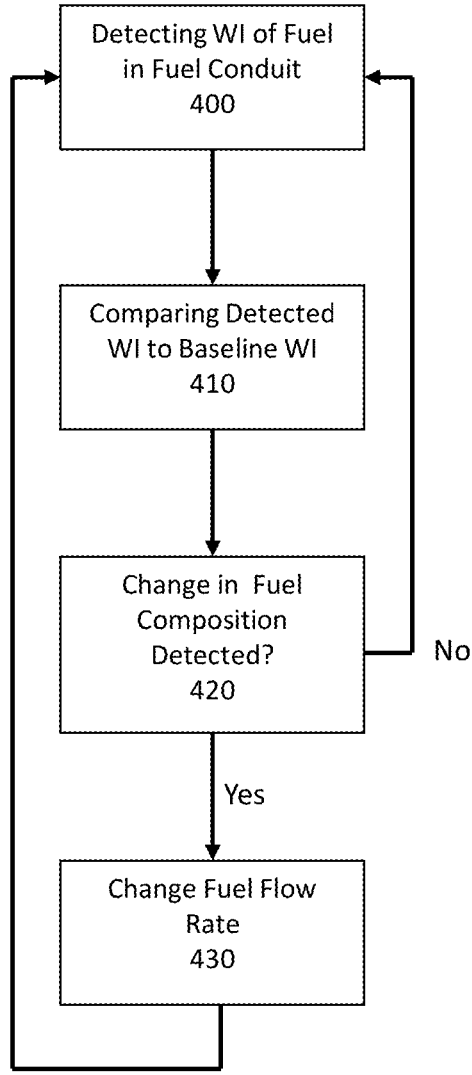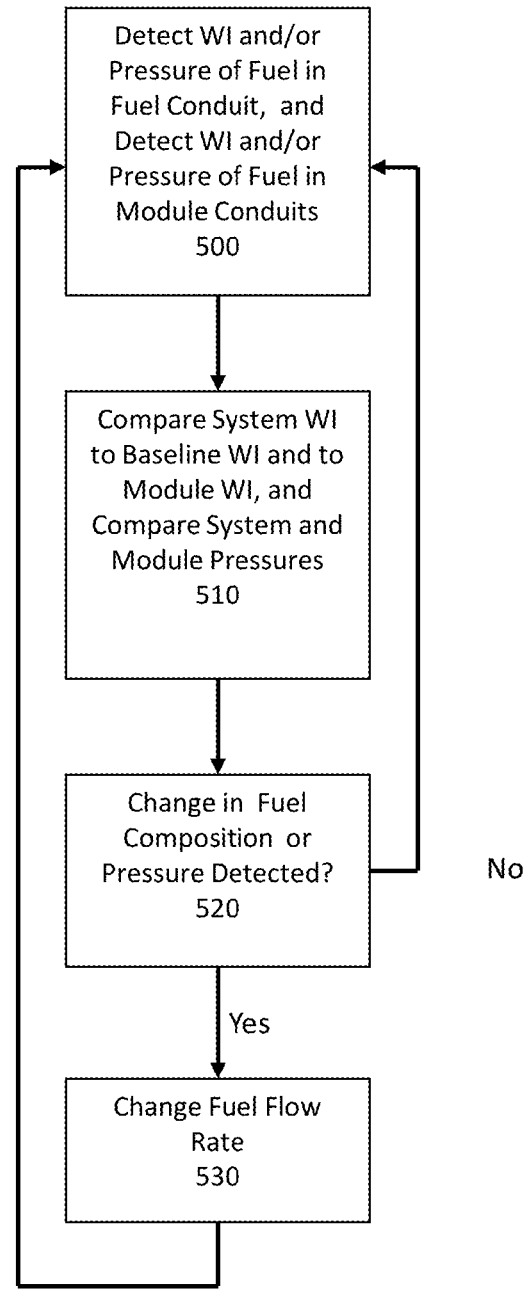
FIG. 4
FIG. 5

FUEL CELL SYSTEM INCLUDING WOBBE INDEX DETECTOR AND METHOD OF OPERATING SAME

FIELD

Aspects of the present invention relate to a fuel cell system including a Wobbe Index detector and a method of operating the same.

BACKGROUND

In a high temperature fuel cell system, such as a solid oxide fuel cell (SOFC) system, an oxidizing flow is passed through the cathode side of the fuel cell while a fuel flow is passed through the anode side of the fuel cell. The oxidizing flow is typically air, while the fuel flow can be a hydrocarbon fuel, such as methane, natural gas, pentane, ethanol, or methanol.

The fuel cell, operating at a typical temperature between 750° C. and 950° C., enables the transport of negatively charged oxygen ions from the cathode flow stream to the anode flow stream, where the ion combines with either free hydrogen or hydrogen in a hydrocarbon molecule to form water vapor and/or with carbon monoxide to form carbon dioxide. The excess electrons from the negatively charged ion are routed back to the cathode side of the fuel cell through an electrical circuit completed between anode and cathode, resulting in an electrical current flow through the circuit.

SUMMARY

According to various embodiments, provided is a solid oxide fuel cell system comprising: a power module configured to receive a fuel from a fuel conduit, the power module comprising: a fuel cell stack; a module conduit fluidly connecting the stack to the fuel conduit; and a fuel control valve (FCV) configured to control a flow rate of the fuel through the module conduit. The system also include a first detector configured to detect a first Wobbe Index (WI) of the fuel in the fuel conduit and a controller configured to control the FCV to change the fuel flow rate according to the detected first WI.

According to various embodiments, provided is a method of operating a solid oxide fuel cell system comprising a fuel cell stack, the method comprising: detecting a change in the Wobbe Index (WI) of a fuel provided to the fuel cell system; and changing a flow rate of the fuel to the fuel cell stack, based on the detected WI, to maintain a substantially constant fuel utilization before and after a change in the composition of the fuel.

According to various embodiments, provided is a method of operating a solid oxide fuel cell system comprising power modules configured to receive a fuel from a fuel conduit, the power modules each comprising a fuel cell stack and a fuel control valve (FCV) configured to control fuel flow through a module conduit fluidly connecting the FCV to the fuel cell stack, the method comprising: detecting a first Wobbe Index (WI) of the fuel in the fuel conduit; detecting a second WI of the fuel in each fuel conduit; and controlling at least one of the FCV's to change a flow rate of the fuel to the corresponding stack, based on a comparison of the first WI and the corresponding second WI, to maintain a substantially constant fuel utilization before and after a change in the composition of the fuel.

BRIEF DESCRIPTION OF THE DRAWINGS

The accompanying drawings, which are incorporated herein and constitute part of this specification, illustrate example embodiments of the invention, and together with the general description given above and the detailed description given below, serve to explain the features of the invention.

FIG. 4 is a process flow diagram illustrating a method of operating a fuel cell system, according to various embodiments of the present disclosure.

FIG. 5 is a process flow diagram illustrating a method of operating a fuel cell system, according to various embodiments of the present disclosure.

DETAILED DESCRIPTION

Figure 1A:
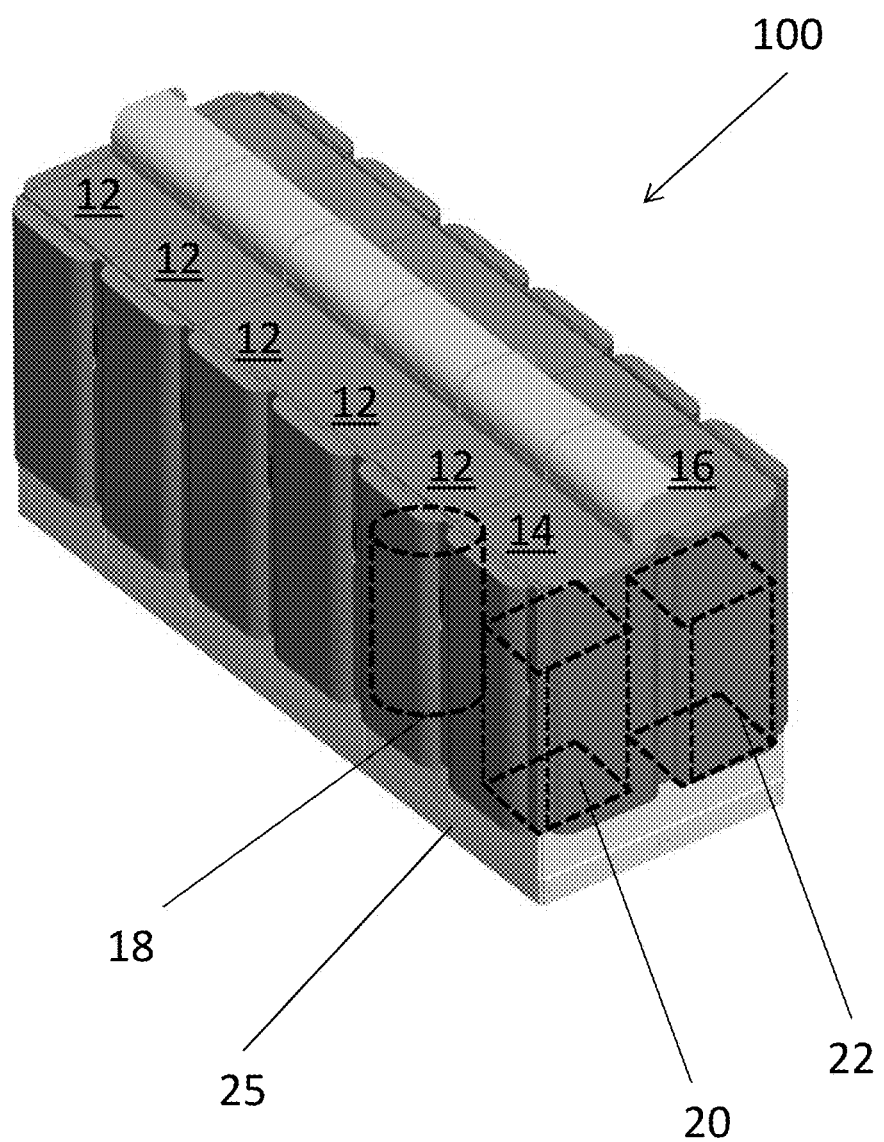
FIG. 1A is a perspective view of a modular fuel cell system 100, according to various embodiments of the present disclosure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The reliability and performance of fuel cell systems, such as a solid oxide fuel cell (SOFC) system, depend on the composition of a fuel provided thereto. For example, a fuel may include undesirable constituents, and the composition of the fuel may vary. For example, a utility may change the composition of the fuel provided to the SOFC system during periods of high demand, through a process known as peak shaving. As a result, the Wobbe Index (WI) of the fuel may also change according to the change in the composition of the fuel.

Accordingly, various embodiments provide a fuel cell system that includes a Wobbe Index detector that can detect changes to the composition of a fuel and make appropriate system adjustments, in order to maintain system performance.

As set forth herein, various aspects of the disclosure are described with reference to the exemplary embodiments and/or the accompanying drawings in which exemplary embodiments of the invention are illustrated. This invention may, however, be embodied in many different forms and should not be construed as limited to the exemplary embodiments shown in the drawings or described herein. It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It will also be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Ranges can be expressed herein as from "about" one particular value, and/or to "about" another particular value. When such a range is expressed, examples include from the one particular value and/or to the other particular value. Similarly, when values are expressed as approximations, by use of the antecedent "about" or "substantially" it will be understood that the particular value forms another aspect. In some embodiments, a value of "about X" may include values of +/−1% X. It will be further understood that the endpoints of each of the ranges are significant both in relation to the other endpoint, and independently of the other endpoint.

Figure 1B:
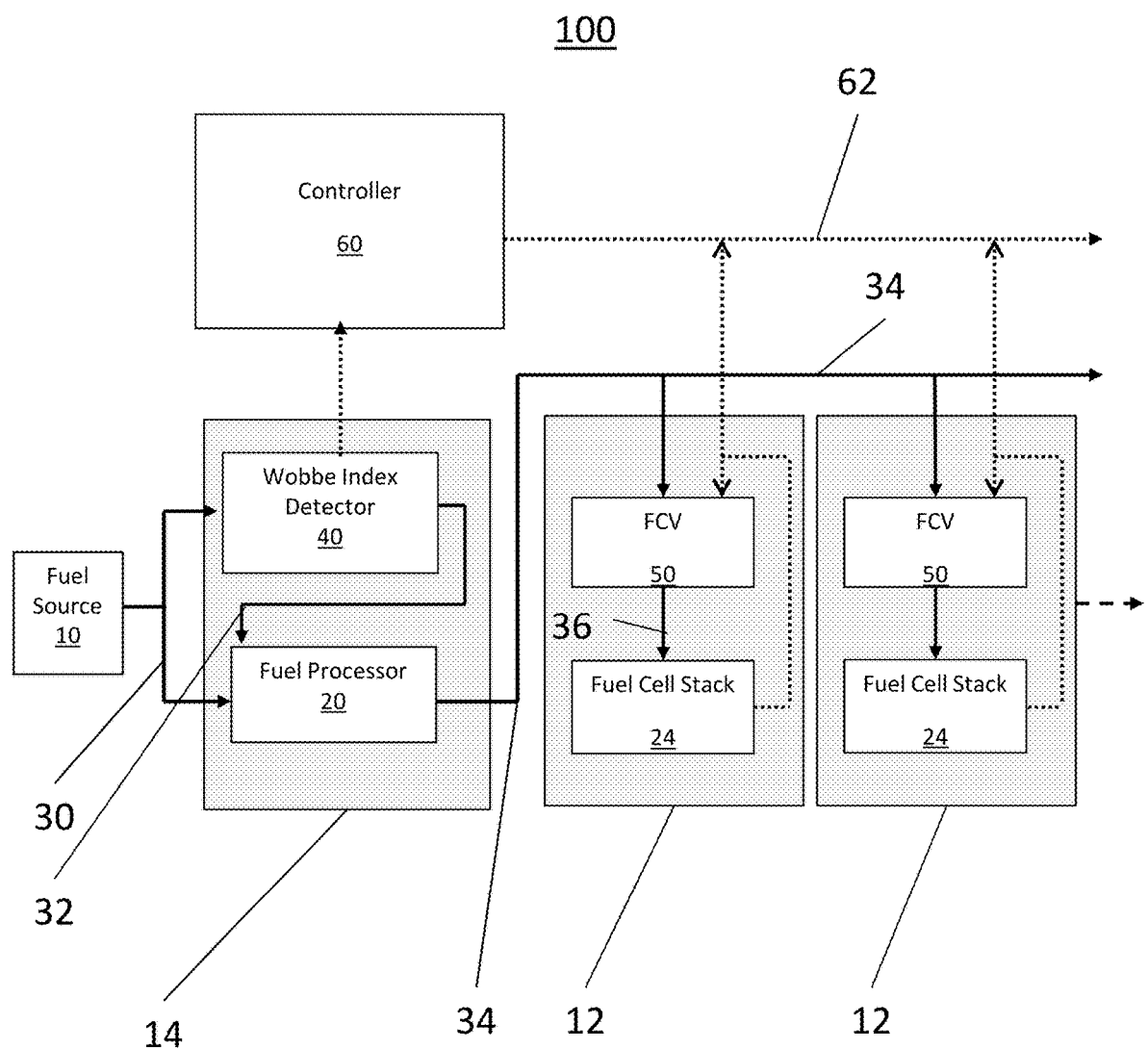
FIG. 1B is a schematic view of the system of FIG. 1A.
Figure 2:
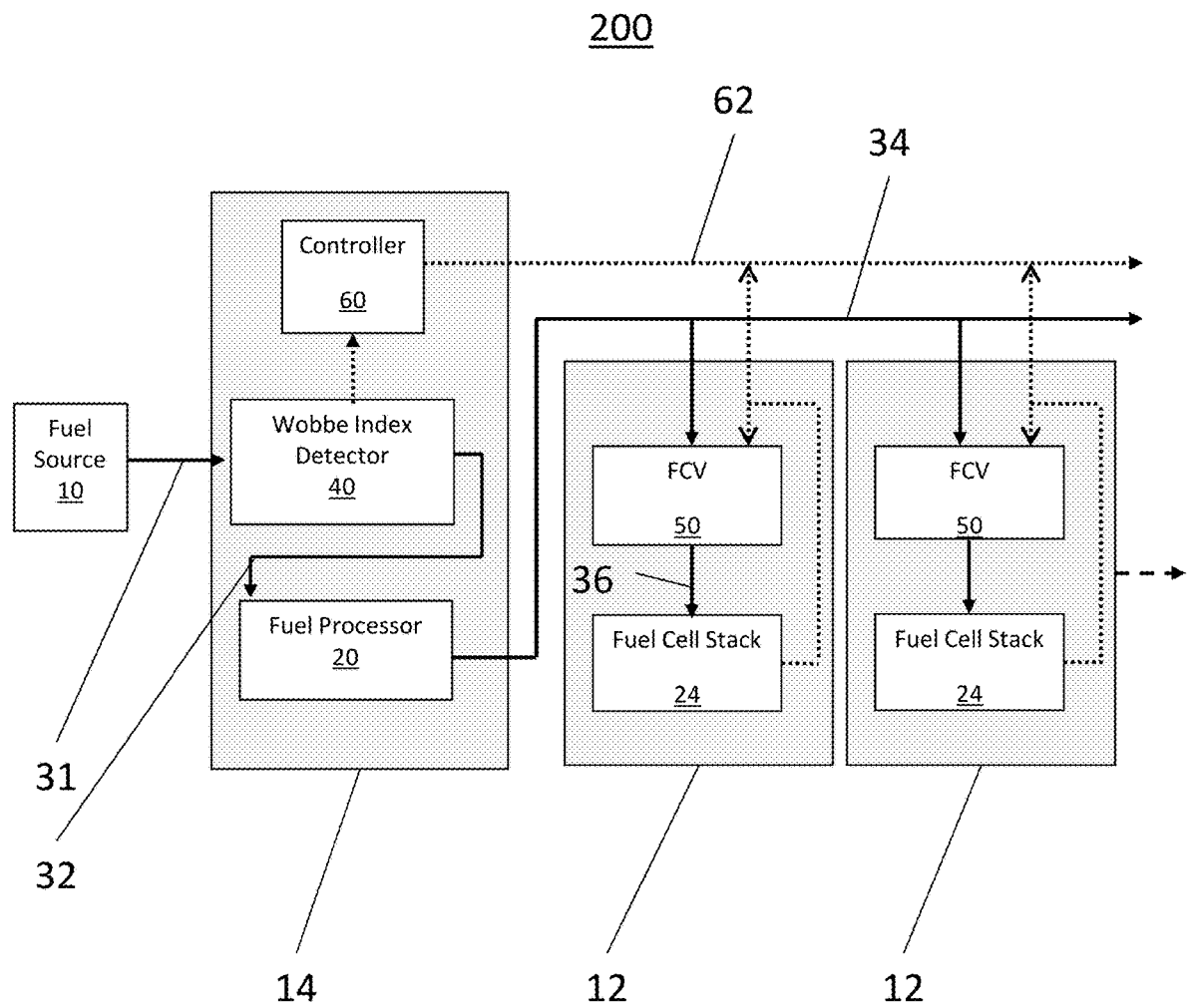
FIG. 2 is a schematic view of a fuel cell system 200, according to various embodiments of the present disclosure.

FIG. 1A is a perspective view of a modular fuel cell system 100, according to various embodiments of the present disclosure, and FIG. 1B is a schematic view of the system 100 of FIG. 1A. Referring to FIGS. 1 and 2, the system 100 may contain modules and components described in U.S. Pat. No. 9,190,693, issued on Nov. 17, 2015, and incorporated herein by reference in its entirety. The modular design of the system 100 provides flexible system installation and operation. Modules allow scaling of installed generating capacity, reliable generation of power, flexibility of fuel processing, and flexibility of power output voltages and frequencies with a single design set. The modular design results in an "always on" unit with very high availability and reliability. This design also provides an easy means of scale up and meets specific requirements of customer's installations. The modular design also allows the use of available fuels and required voltages and frequencies which may vary by customer and/or by geographic region.

According to various embodiments, the system 100 includes power modules 12, a fuel processing module 14, and a power conditioning (i.e., electrical output) module 16. In various embodiments, the power conditioning modules 16 are configured to deliver direct current (DC). In alternative embodiments, the power conditioning modules 16 are configured to deliver alternating current (AC). In these embodiments, the power condition modules 16 include a mechanism to convert DC to AC, such as an inverter 22.

FIG. 1A illustrates a system 100 containing six power modules 12 (two row of six modules stacked side to side), one fuel processing module 14, and one power conditioning module 16 on a common base 25. However, the system 100 may include any desired number of modules, such as 2-30 power modules, for example 3-12 power modules, such as 6-12 modules. Each module may comprise its own cabinet. Alternatively, modules 14 and 16 may be combined into a single input/output module located in one cabinet. While two rows of power modules 12 are shown, the system 100 may comprise any number of rows of modules.

Each power module 12 is configured to house one or more hot boxes 18. Each hot box 18 contains one or more fuel cell stacks 24, such as one or more stacks of solid oxide fuel cells having a ceramic oxide electrolyte separated by conductive interconnect plates. Other fuel cell types, such as PEM, molten carbonate, phosphoric acid, etc. may also be used.

The fuel cell stacks 24 may comprise externally and/or internally manifolded stacks. For example, the stacks may be internally manifolded for fuel and air with fuel and air risers extending through openings in the fuel cell layers and/or in the interconnect plates between the fuel cells.

Alternatively, the fuel cell stacks 24 may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

According to various embodiments, the fuel processing module 14 is fluidly connected to a fuel source 10 configured to provide a fuel thereto. The fuel source 10 may be a fuel tank or may be a connection to a fuel pipeline or the like. Typical fuels for fuel cell operation are fuels comprising hydrogen and carbon. Examples of typical fuels provided by the fuel source 10 include, but are not limited to hydrocarbons (including methane, ethane and propane), natural gas from a pipeline, compressed natural gas, hydrogen, alcohols (including ethanol), syngas derived from coal or natural gas reformation, biogas, landfill gas, or carbon and hydrogen containing gas generated as a by-product of waste water treatment.

Given the potential deployment of fuel cell systems in a multitude of locations, each subject to variances in fuel composition and local atmospheric conditions, it is desirable to have a relatively few simplified parameters to characterize the fuel and oxidizing gas for control of fuel cell systems. Such simplified parameterized control has the added benefit of easing the transition from one fuel source to another while the fuel cell is under load or enabling the utilization of a plurality of fuels, oxidation gases, or both, at the same time.

The parameterized control of fuel cell system operation can be accomplished through the use of a few derived quantities (e.g., fuel composition, fuel utilization, and oxidizing gas utilization) and that simplified derivation of these quantities can be accomplished through calculations based on characterizing fuel composition and oxidizing gas composition. In instances where the oxidizing gas is air, local atmospheric conditions can be used to derive the oxidizing gas composition. Such a control system is described in U.S. Pat. No. 8,211,583, which is incorporated herein by reference.

According to various embodiments, the fuel processing module 14 includes a fuel processor 20 and a detector 40 fluidly connected to the fuel source 10. The detector 40 may be configured to detect the Wobbe Index (WI) of a fuel and/or a fuel pressure in the system 100. The system 100 may include a fuel source conduit 30 connecting the fuel source 10 to the detector 40 and the fuel processor 20, in parallel. An output of the detector 40 may be connected to the fuel processor 20 by a detector conduit 32. In other embodiments, the detector 40 may be located on a bypass loop connected to the fuel source conduit 30. An output of the fuel processor 20 may be connected to the power modules 12 by a module conduit 34. In particular, the fuel may be provided to anodes of the fuel cell stacks 24. The system 100 may include a fuel control valve (FCV) 50 configured to control fuel flow through a module conduit 36 fluidly connecting the module conduit 34 to a corresponding fuel cell stack 24. In other embodiments, the system 100 may have one FCV 50 to control fuel flow though the module conduit 34 and to the modules 12. Herein, the fuel source conduit 30, the detector conduit 32, and the module conduit 34 may be collectively referred to as a "fuel conduit" of the system or a "system fuel conduit". Although not shown, each power module 12 may also include an oxidant conduit configured to provide an oxidant to cathodes of the fuel cell stacks 24.

The fuel processor 20 may be configured to purify the fuel. For example, the fuel processor 20 may be configured to remove contaminants, such as siloxanes, moisture, oxygen, sulfur (including sulfur compounds such as organosulfur compounds), and other fuel cell stack poisons from the fuel.

In some embodiments, the fuel processor 20 may include one or more adsorption bed assemblies that include desulfurizer and/or other impurity adsorption beds/filters. The fuel processor 20 may be designed to process different types of fuel. For example, a diesel fuel processing module, a natural gas fuel processing module, and an ethanol fuel processing module may be provided in the same or in separate cabinets. A different bed composition tailored for a particular fuel may be provided in each module.

The fuel processing module 14 may also include components for detecting the undesirable constituent downstream from a given absorption bed, which indicates a breakthrough event (i.e., bed exhaustion). Once a breakthrough event is detected, a reserve capacity absorption bed may be used to prevent more undesirable constituent from reaching the fuel cell stack (i.e., power generation module). Specifically, control systems may change the operation of the fuel cell system by altering fuel flow, utilizing a reserve absorption bed, powering portions of the fuel cell system on/off, selecting different fuel sources, etc.

The composition of the fuel may vary. For example, when the fuel is provided from a utility via a pipeline, the utility may change the composition of the fuel, for example, during periods of high demand, in a process known as peak shaving. As a result, the WI of the fuel may also change. The WI or Wobbe number is an indicator of the combustion energy output fuel gases, and especially fuel gas mixtures, such as mixtures of natural gas, liquefied petroleum gas (LPG), and city gas, and is frequently defined in the specifications of gas supply and transport utilities. The Wobbe index ($I_W$) may be defined using the following Formula 1:

$$I_W = \frac{V_C}{\sqrt{G_S}}.$$

In the Formula 1, $V_C$ is the higher heating value, and $G_S$ is the specific gravity. The WI is used to compare the combustion energy output of different composition fuel gases in an appliance. If two fuels have identical Wobbe Indices then for given pressure and valve settings the energy output will also be identical.

Accordingly, the detector 40 may be configured to detect changes to the WI of the fuel provided by the fuel source 10. In particular, the detector 40 may determine a baseline WI baseline corresponding to the composition of a particular fuel. The detector 40 may periodically or constantly detect the WI of the fuel (e.g., a system WI), and the detected WI may be compared to the baseline WI, to determine whether the composition of the fuel has changed.

In particular, the system 100 may include a controller 60. For example, the controller 60 may be electrically and/or informationally connected to the detector 40, the FCV's 50, and/or the fuel cell stacks 24, as indicated by the dotted lines 62 in FIG. 1B. However, the controller 60 may also be connected to other elements of the system 100, such as blowers, thermocouples, power control components (e.g., DC/DC converters or inverters), or any combination thereof, in module 16.

The present disclosure is not limited to any particular type of connection between these elements. For example, the elements may be connected by wires or may be connected wirelessly. The controller 60 may include software and/or hardware configured to detect fuel composition changes, by comparing a detected WI to the baseline WI. If a fuel composition change is detected, the controller 60 may make a corresponding change to the amount of fuel supplied to the fuel cell stacks 24. In particular, the controller 60 may increase and/or decrease a fuel flow rate to one or more of the fuel cell stacks 24, by adjusting the corresponding FCV 50, based on the detected WI. For example, the controller 60 may include a lookup table including WI values and corresponding fuel utilization amounts (and fuel flow values). As used herein, the term "fuel flow rate" is used to express the quantity of fuel introduced into the fuel cell stack.

The controller 60 may include a computing device (e.g., a central processing unit and memory) included in one or modules of the system 100, or may be embodied as software residing on a remote server electrically connected to the system 100. For example, the detector 40 may be connected to the controller 60 via the Internet and/or may be directly connected through wired or wireless methods.

FIG. 2 is a schematic view of a fuel cell system 200, according to various embodiments of the present disclosure. The system 200 is similar to the system 100, so only the differences therebetween will be discussed in detail. Like reference numbers refer to like elements.

Referring to FIG. 2, the controller 60 incorporated into the fuel processing module 14 of the system 200. However, the present disclosure is not limited thereto. For example, the controller 60 may be incorporated into other modules of the system 200.

The fuel source 10 is connected to the detector 40, via a fuel conduit 31. An output of the detector is then connected to an input of the fuel processor 20 by the detector conduit 32. Accordingly, as compared to the parallel connection of the system 100, the system 200 connects the detector 40 and the fuel processor 20 in series. According to some embodiments, the detector 40 and the fuel processor 20 may be rearranged, such that the fuel processor 20 is located upstream of the detector 40, with respect to a fuel flow direction through the system 200.

Figure 3:
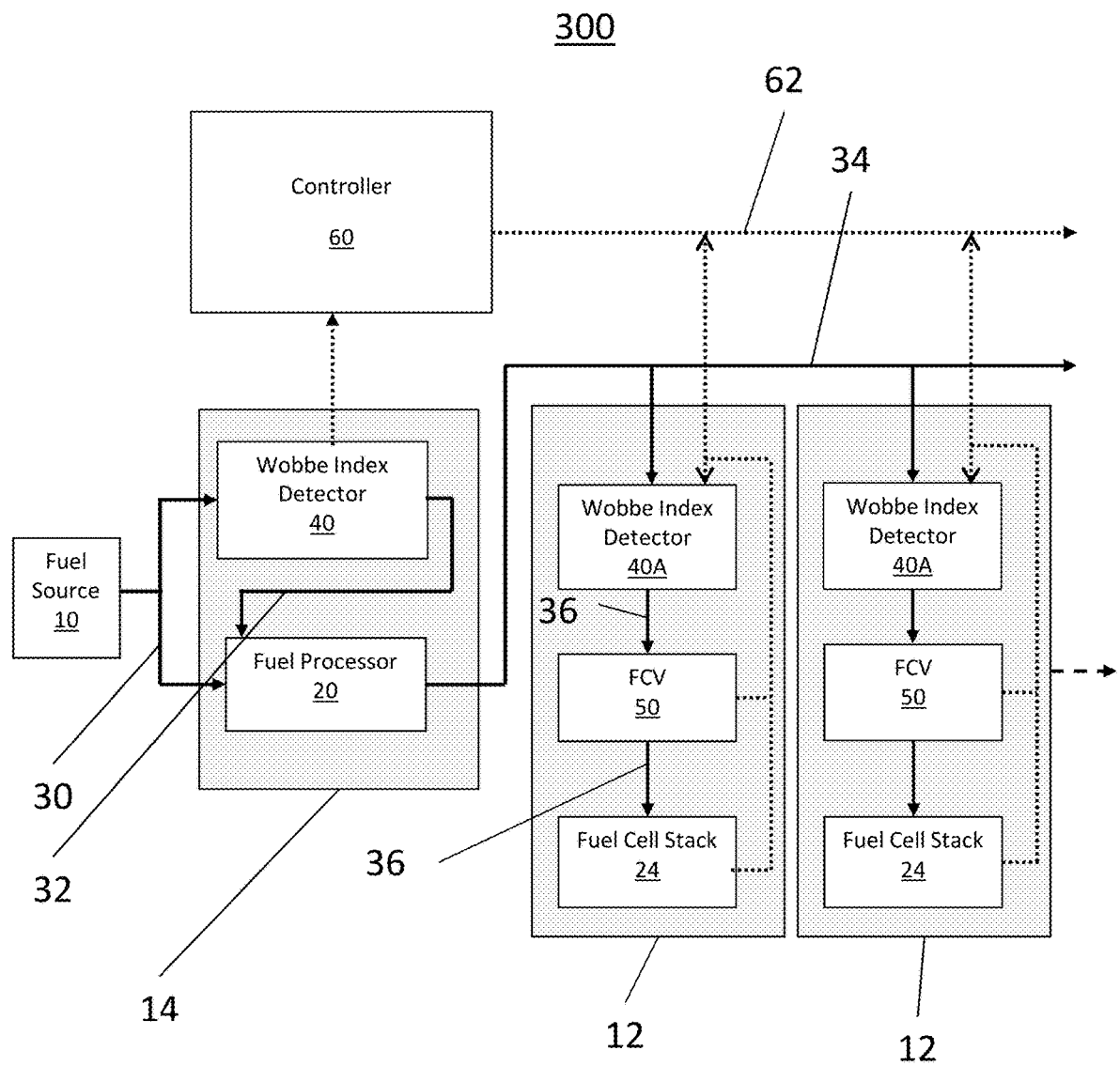
FIG. 3 is a schematic view of a fuel cell system 200, according to various embodiments of the present disclosure.

FIG. 3 is a schematic view of a fuel cell system 300, according to various embodiments of the present disclosure. The system 300 is similar to the system 100, so only the differences therebetween will be discussed in detail.

Referring to FIG. 3, the system 300 includes additional detectors 40A in the power modules 12. The detectors 40A may be fluidly connected to the FCV 50 and the fuel cell stack 24 of each power module 12. In particular, each detector 40A may be upstream of the FCV 50 and the fuel cell stack 24, with respect to a flow direction of fuel through a corresponding power module 12. However, in other embodiments, each detector 40A may be located downstream of a corresponding FCV 50. While the detectors 40A and the fuel cell stacks 24 are shown to be connected in series, the present disclosure is not limited thereto. For example, the detectors 40A and the fuel cell stacks 24 may alternatively be connected in parallel in each power module 12.

In each power module 12, the detector 40A may detect the WI of the fuel provided to the FCV 50 (e.g., a detected module WI). The controller 60 may compare the detected module WI to the system WI detected by the detector 40, in order to determine whether the FCV is operating properly and/or whether the system 300 has developed any fuel leaks.

According to some embodiments, the detectors 40, 40A may be configured to detect a pressure in the fuel conduit 30 (system pressure) and a pressure in each of the module conduits 36 (module pressures), respectively. The controller 60 may be configured to compare the detected system and module pressures, in order to determine whether the corresponding FCV's 50 are operating properly. In particular, changes in the detected pressures may indicate a change in fuel flow rate, which may indicate that the corresponding FCV 50 of a given power module 12 is malfunctioning. If the change in pressure exceeds a delta pressure value, the controller 60 may be configured to reduce or stop fuel flow to the corresponding power module 12.

FIG. 4 is a process flow diagram illustrating a method of operating a fuel cell system, such as the fuel cell systems 100, 200, and/or 300, according to various embodiments of the present disclosure. Referring to FIG. 4, step 400 of the method may include detecting a WI of a fuel in a fuel conduit connecting power modules to a fuel source. Step 410 may include comparing the detected WI to a baseline WI (e.g., a stored WI). Step 420 may include detecting a change in fuel composition, base at least in part on the result of the comparison of step 410. If the comparison indicates a change in the composition of the fuel, the method may proceed to step 430. Step 430 includes changing a fuel flow rate to the power modules to keep fuel utilization substantially constant despite changes in fuel composition. If a change is fuel composition is not detected in step 420, the method may return to step 400.

Step 400 may include establishing the baseline WI. For example, the baseline WI may be a WI of a fuel taken during startup of the system, or an average of WI measurements taken over a given period of time and stored in a lookup table. In the alternative, the baseline WI may be provided from an external source, such as a fuel provider.

Step 430, as discussed above, may include controlling a FCV of one or more power modules, according to the change detected in step 420. For example, a fuel flow rate to the fuel cell stacks may be increased and/or decreased to keep fuel utilization substantially constant, according at least in part to a result of the comparison.

FIG. 5 is a process flow diagram illustrating a method of operating a fuel cell system, such as the fuel cell system 300, according to various embodiments of the present disclosure. Referring to FIG. 5, step 500 of the method may include detecting a system WI of fuel in a system fuel conduit connecting power modules to a fuel source, and detecting module WI's of fuel in module conduits of each of the power modules. Step 510 may include comparing the detected system WI to a baseline WI (first comparison), and comparing each module WI to the system WI (second comparison). Step 520 may include detecting a change in fuel composition (step 520) based at least in part on results of the first and second comparisons.

If the first comparison indicates a change in the composition of the fuel, the method may proceed to step 530. In no change in composition is detected, the method may return to step 500. If the first and second comparisons indicate a change in fuel composition, step 530 may include changing a fuel flow rate to all of the power modules by the same amount, by adjusting the corresponding FCV's.

According to some embodiments, step 500 may include detecting a pressure in the system fuel conduit (system pressure) and detecting pressures in the power module conduits (module pressures). Step 510 may include comparing the detected system pressure and the module pressures. Step 530 may include changing the fuel flow rates of the power modules where a differential between the system and module pressures exceeds a set delta pressure value.

If the first comparison does not indicate a change in fuel composition, and one or more of the second comparisons indicates a change in fuel composition, step 530 may include changing fuel flow rates in only the fuel modules where a fuel composition change is detected. For example, a relatively low module WI in comparison to the system WI may indicate a leak or FCV malfunction. Accordingly, the system may shutoff fuel flow to the corresponding power module(s).

In another embodiment, the fuel utilization differs for different stacks 24 in the same or different modules 12, and/or the fuel utilization differs for different modules 12 based on the health of the respective stacks 24 and/or modules. In this embodiment, it is desirable to maintain a substantially constant fuel utilization in each module 12 or in each stack 24 before and after the change in fuel composition. Thus, different stacks 24 and/or modules 12 may have different fuel flow rates based on the respective differences in health. When a chance in WI is detected, the fuel flow rate may be changed by a different amount to respective stacks 24 and/or modules 12 by different adjustments to different FCVs based on their respective health to maintain their respective fuel utilizations substantially constant over time before and after the change in WI is detected.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A method of operating a fuel cell system comprising a fuel cell stack, the method comprising:
    detecting a change in a Wobbe Index (WI) of a fuel provided to the fuel cell system; and
    changing a flow rate of the fuel to the fuel cell stack, based on the detected change in the WI.

2. The method of claim 1, wherein the detecting a change in the WI comprises:
    detecting the WI of the fuel; and
    comparing the detected WI to a baseline WI.

3. The method of claim 1, wherein the detecting a change in the WI comprises comparing the detected WI to a look up table comprising WI's of corresponding fuel compositions.

4. The method of claim 1, wherein the detecting a change in the WI comprises detecting a first WI of the fuel in a system conduit configured to provide the fuel to a fuel control valve (FCV) that controls a flow rate of the fuel to the fuel cell stack.

5. The method of claim 4, further comprising detecting a second WI of the fuel in a module conduit that fluidly connects the FCV to the fuel cell stack.

6. The method of claim 5, further comprising determining a health of the fuel cell system based a comparison of the first WI and the second WI.

7. The method of claim 6, wherein determining the health of the fuel cell system comprises determining one or more of whether the FCV is operating normally and whether the fuel cell system has a fuel leak.

8. The method of claim 1, further comprising:
   detecting a system pressure of in a fuel conduit configured to provide the fuel to a fuel control valve (FCV) that controls fuel flow to the fuel cell stack;
   detecting a module pressure of a module conduit that fluidly connects the FCV to the fuel cell stack; and
   comparing the system and module pressures to determine a health of the fuel cell system.

9. A method of operating a fuel cell system comprising power modules configured to receive a fuel from a fuel conduit of the system, the power modules each comprising a fuel cell stack and a fuel control valve (FCV) configured to control fuel flow through a module conduit fluidly connecting the FCV to the fuel cell stack, the method comprising:
   detecting a first Wobbe Index (WI) of the fuel in the fuel conduit;
   detecting a second WI of the fuel in each module conduit; and
   controlling at least one of the FCV's to change a flow rate of the fuel to the corresponding stack, based on a comparison of the first WI and the corresponding second WI, to maintain a substantially constant fuel utilization before and after a change in the composition of the fuel.

10. The method of claim 9, further comprising:
    comparing the first WI to a reference WI; and
    controlling at least one of the FCV's to change a fuel flow rate to the corresponding fuel cell stack, when the comparison indicates a change in the composition of the fuel in the fuel conduit, to maintain a substantially constant fuel utilization before and after the change in the composition of the fuel.

11. The method of claim 9, further comprising:
    detecting a system pressure of the fuel in the fuel conduit;
    detecting a module pressure of the fuel in each module conduit; and
    determining a health of the fuel cell system, based on a comparison of the system pressure and the module pressures.

12. The method of claim 11, wherein the determining the health of the fuel cell system comprises determining whether the FCV is operating normally, determining whether the fuel cell system has a fuel leak, or a combination thereof.

* * * * *